April 21, 1964 S. A. SEYMOUR ETAL 3,129,851
FEEDER FOR STOCK ANIMALS
Filed Jan. 23, 1962 4 Sheets-Sheet 2

INVENTORS
SHAUN A. SEYMOUR, WILLIAM HOBBS,
JR., & DANIEL C. HEITSHU
Joseph A. Brun
ATTORNEY

United States Patent Office 3,129,851
Patented Apr. 21, 1964

3,129,851
FEEDER FOR STOCK ANIMALS
Shaun A. Seymour, New Holland, William Hobbs, Jr., Lancaster, and Daniel C. Heitshu, Shippensburg, Pa., assignors to Sperry Rand Corporation, New Holland, Pa., a corporation of Delaware
Filed Jan. 23, 1962, Ser. No. 168,071
17 Claims. (Cl. 222—76)

This invention relates generally to apparatus for delivering feed to stock animals. More particularly, the invention relates to a fill and dump stock feeder whereby a plurality of stock animals get their feed at the same time. The invention is an improvement in the feeding device shown and described in Winter U.S. Patent No. 2,940,639, issued June 14, 1960.

In feeding stock animals, such as steers, it is highly desirable to have all the animals get their feed at the same time. A feeding station may be of any desired length, such as one hundred and fifty feet. The animals can stand side by side and feed from a long trough. If feed is deposited in all portions of the trough at the same time, in a substantially continuous uniform ribbon, all animals will have equal opportunity to feed and they can all begin feeding simultaneously.

Animals become acquainted and accustomed to simultaneous mass feeding, and when feeding time arrives they stand quietly awaiting the feed. By contrast, when progressive feeding is employed substantial crowding results. By progressive feeding is meant the feeding of a feed trough beginning at one end thereof and progressively discharging feed along the trough until the terminal end is reached. Boss cattle will crowd and maneuver for position at the end of the trough where the feed first enters. When they finish the feed in front of them, they will frequently move toward the trough terminal end to secure additional feed. Such movement and agitation affects the metabolism of all of the animals and interferes with their digestion. With progressive feeding, a certain amount of feed is required to achieve a given weight gain of animals. With simultaneous feeding, the same weight gain can be achieved with less feed or a greater weight gain with the same feed. The end result is that simultaneous feeding means less cost per pound of meat produced.

In the feeding device shown in the Winter patent, a horizontally extending rotatable container tube has a longitudinal discharge slot, adapted to be located in an upper twelve o'clock position when the feeder is idle and when feed is being distributed along the length of the tube. A cover is provided for the slot so that when the container tube is in a position with the slot up, rain, snow and the like will not enter. In a dumping cycle, the tube is rotated three hundred and sixty degrees. Discharge of the material from the tube is achieved when the slot passes a six o'clock or lower position.

One object of this invention is to provide a fill and dump stock feeder of the character described having a rotatable, horizontal container tube formed with a straight discharge slot along the length thereof and having means for locating the slot in a down position when the feeder is not in use whereby a cover is rendered unnecessary to protect the tube from the weather.

Another object of this invention is to provide a stock feeder of the character described wherein a discharge slot is normally located in a down position when the feeder is not in use, and subsequently moved to an upper position and then stopped while feed is being distributed along the length of the tube and then moved back to a lower position to dump the contents of the tube.

Another object of this invention is to provide a stock feeder of the character described having a container tube which rotates three hundred and sixty degrees during each dumping cycle except the last cycle of a series, wherein it rotates only one hundred and eighty degrees so that the tube discharge slot will be located in the down position when the device is at rest.

Another object of this invention is to provide a stock feeder of the character described having positive electromechanical means for stopping rotation of the tube and preventing the discharge slot from drifting past a down position or an up position, as required.

Another object of this invention is to provide a stock feeder of the character described wherein a single power means drives a feed distributing conveyor and also operates the means for rotating the discharge container tube of the feeder.

Another object of this invention is to provide a pair of switch actuators on a conveyor tube and rotatable therewith, simple mounting means enabling adjustment of the actuators relative to the tube.

A further object of this invention is to provide, in a stock feeder of the character described, means for preventing a rotatable feed tube from overrunning its drive means when the tube is rotated.

A further object of this invention is to provide an electrical circuit, and components therein, which will provide for completion of a given feeding operation if there is a power failure at a point between the starting of a feeding cycle and the completion thereof.

A still further object of this invention is to provide in a stock feeder of the character described, means whereby the feeder is subject to semi-automatic and full automatic operation.

Other objects of this invention will be apparent hereinafter from the specification and from the recital in the appended claims.

Referring now to the drawings by numerals of reference, and first to FIGS. 1, 2 and 5, 15 denotes generally a stock feeder which comprises a supply hopper 16 supported on a frame 18. One side wall 19 of hopper 16 has a discharge opening 20 (FIG. 1) and communicating therewith is an elongated feed container tube 21 which extends horizontally. Container 21 comprises a plurality of container sections each of which may be of any desired length such as ten feet per section. The successive sections are connected together and provide an overall container length, such as one hundred and fifty feet to extend over an animal feeding station such as an elongated trough, not shown. In cross section container 21 is generally tubular, having a longitudinal slot 22 which extends the full length of the container and parallel to its longitudinal axis. The end 23 of the container 21 is connected to the hopper for rotatable movement relative thereto. The connection provided is shown best in FIG. 1. An outer race 24 of a bearing is fastened to the hopper 16 by bolts 25. The inner race 26 of such bearing is connected by bolts 28 to the adjacent end of container 21. A continuous series of balls 29 is provided between the respective races whereby the container may be freely rotated relative to the hopper 16.

Suitable stands, not shown, are provided for supporting container tube 21 for rotatable movement. These stands are longitudinally spaced relative to each other along the container, with a support 30 being provided at the end of the feeder remote from hopper 16. Support 30 has a cylindrical band 31 into which the terminal end 32 of the container projects. Suitable rollers, not shown, may be provided on each stand to facilitate rotation of the container.

Figure 1:
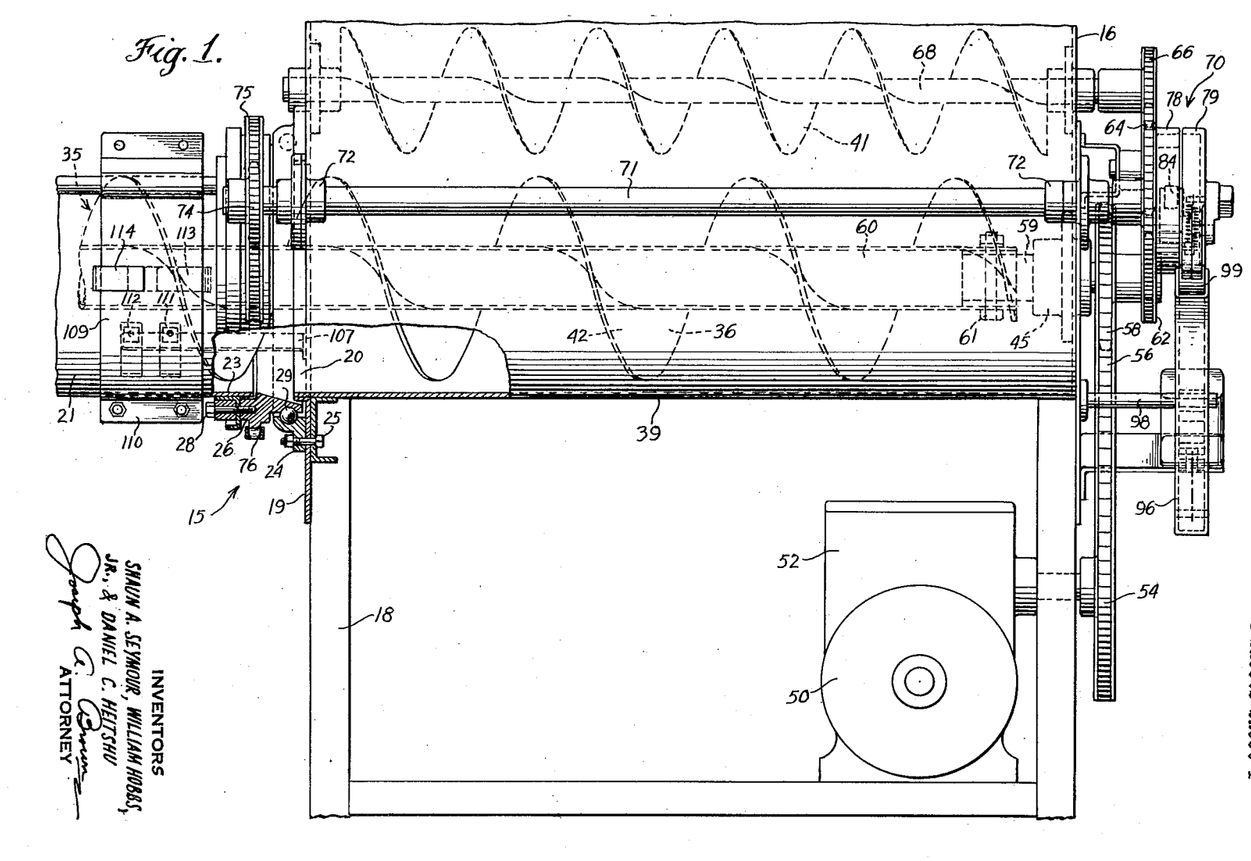
FIG. 1 is a fragmentary side elevation of the hopper end of a fill and dump stock feeder constructed according to this invention, the feed distributing container tube being shown with its discharge slot in an up, fill position.
Figure 2:
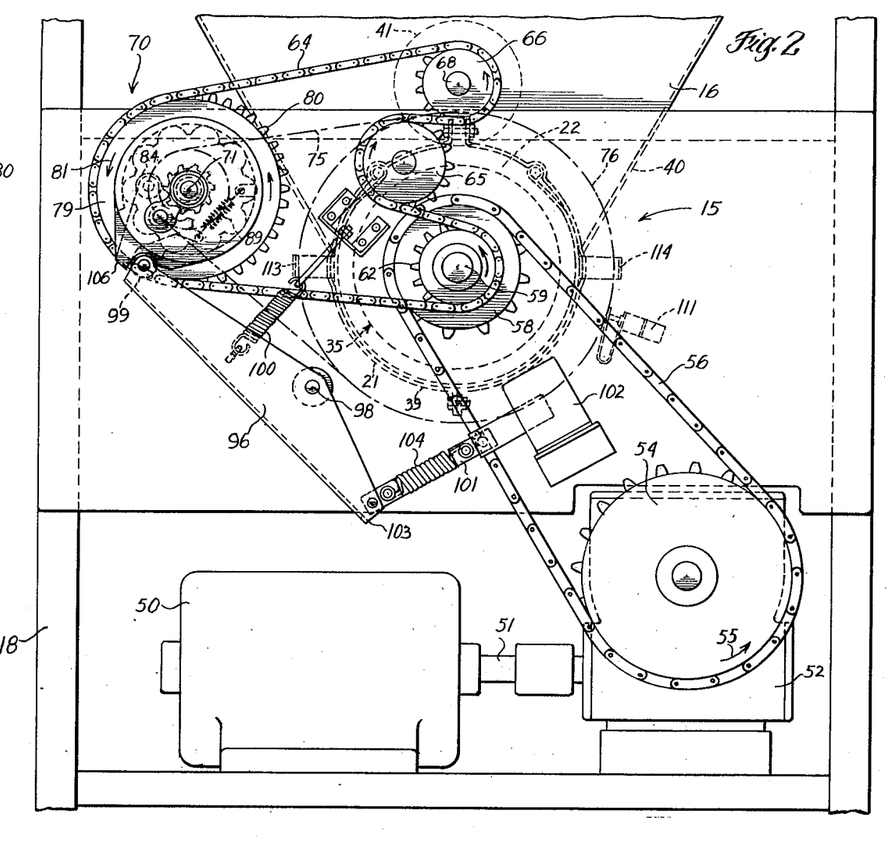
FIG. 2 is an end view looking from right to left in FIG. 1.

Operative to withdraw feed material from hopper 16 and to convey and distribute such material along the length of the container 21 is conveyor means in the form of an auger 35 having a section 36 which extends in hopper 16 and a section 38 which extends from one end of the container tube to the other. The bottom 39 of the hopper 16 is arcuate and concentric to auger 35 as best shown in FIG. 2. The side walls 40 of the hopper converge whereby the feed will be directed down into the curved bottom portion 39. To prevent feed material from bridging, an agitator 41 is provided in the hopper 16 and above the auger section 36. When the auger rotates, the flights 42 within hopper 16 operate to withdraw feed and discharge it through outlet opening 20. The flights 44 on the portion of the auger in container 21 operate to convey and distribute the material along the length of the container. The diameter of container 21 is slightly larger than the diameter of auger 35. The end of the auger which projects into the hopper 16 is supported on a bearing member 45 (FIG. 1) affixed to the hopper and the terminal, remote end of the auger is supported on a stub shaft 46 (FIG. 5) which projects into the auger. Intermediate its ends, the auger rests upon the bottom of contianer 21 and is supported thereby.

The auger 35, agitator 41 and cotnainer 21 are all adapted to be operated, i.e. rotated, from a single source of power namely a motor 50. As shown in FIGS. 1 and 2, the motor 50 is mounted on frame 18 beneath hopper 16. It has an output shaft 51 connected to a reduction gear box 52 having a power output sprocket 54. When the motor 50 is operating, the sprocket 54 is driven continuously in a counterclockwise direction as indicated by the arrow 55. Wrapped around sprocket 54, to be driven thereby, is an endless chain 56 which drives a sprocket 58 fixedly connected to a shaft 59. Shaft 59 projects into hopper 16 and is connected to auger 35 by a bolt 61 (FIG. 1). With the drive sprocket 54 rotating in a counterclockwise direction, the sprocket 58 will be similarly rotated to thereby drive auger 35 to remove feed material from hopper 16 and convey it along the container 21. Mounted externally of hopper 16 and on an outwardly projecting end of shaft 59 is a sprocket 62 around which an endless chain 64 extends. The chain 64 passes around an idler sprocket 65 supported on hopper 16 and then around a sprocket 66 connected to the shaft 68 of agitator 41. Therefore, when auger 35 is operated, the agitator is also operated.

Endless chain 64 provides the driving power for rotating container tube 21 after feed has been distributed along the length of the container. The drive from chain 64 to the container tube is controlled through a clutch 70. Extending alongside hopper 16 and parallel to auger 35 is a shaft 71 which is supported adjacent its ends on suitable bearings 72 carried on hopper frame 18. Clutch 70 is disposed on one end of shaft 71 and the opposite end of the shaft adjacent container 21 has a sprocket 74 connected to it. Extending around the sprocket 74 is a chain 75 which is trained around sprocket 76 integral with the inner race 26 of the roller bearing connection between container tube 21 and hopper 16. When shaft 71 is rotated, it operates through chain 75 to rotate the container tube.

Figure 3:
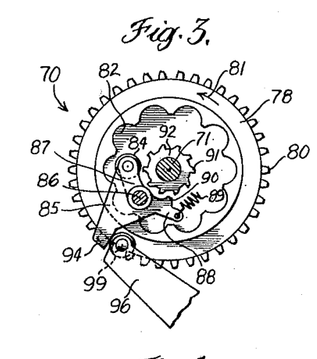
FIG. 3 is a detail view of the feeder clutch for controlling rotation of the feeder tube, the clutch being shown with the outer member thereof removed and with a clutch control lever holding a clutch pawl in inoperative disengaged position.
Figure 4:
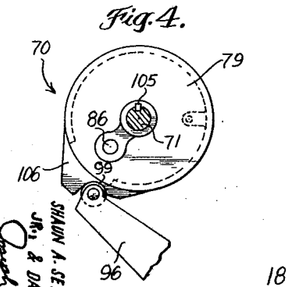
FIG. 4 is a view similar to FIG. 3 showing the outer clutch member.
Figures 5, 8:
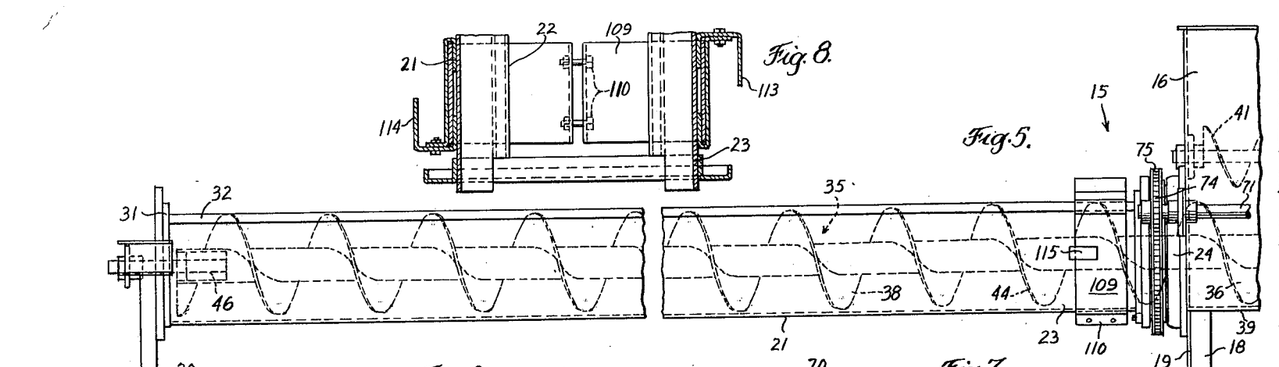
FIG. 5 is a fragmentary side elevation of the feeder, on a reduced scale, showing the feed hopper, the feeder tube with its slot in an up, fill position, and the support structure at the terminal end of the feeder.
FIG. 8 is a section taken on the line 8—8 of FIG. 6 showing the band on the feeder container tube and the switch actuators carried on the band.

The transmission of power to shaft 71 is regulated through clutch 70 which comprises an inner driving clutch member 78 and a normally stationary outer driven clutch member 79, shown best in FIGS. 3 and 4. The member 78 rotates constantly when chain 64 is moving and it is normally freely rotatable on the end of shaft 71 adjacent chain 64. Clutch member 78 has peripheral teeth 80 forming a sprocket about which the chain 64 extends to be rotated thereby. Clutch member 78 rotates in the direction indicated by arrow 81. It has internal scallops 82 adapted to be engaged by a roller 84 carried on a pawl 85. Pawl 85 is pivotally mounted on pin 86 carried on outer clutch member 79 which is in turn affixed to shaft 71. The pawl has one leg 87 which supports roller 84 and another leg 88 to which a spring 89 is connected to constantly bias roller 84 toward operative engagement with the scallops 82. The arm 88 has a tooth 90 adapted to engage one of the teeth 91 on a gear wheel 92 affixed to the shaft 71 when roller 84 is pivoted into engagement with one of the scallops 82. Projecting radially outwardly from pin 86 is a pawl arm 94 adapted to be operated by a clutch control lever 96. Lever 96 is pivotally mounted intermediate its ends at 98 on frame 18. One end of lever 96 has a roller 99 engageable with the projecting arm 94. A spring 100 is connected to lever 96 and frame 18 to bias the roller 99 toward operative engagement with the periphery of clutch 70, as shown in FIG. 2. In such position, lever 96 holds pawl 85 pivoted against the resistance of spring 89 and pawl roller 84 is held out of scallops 82.

The lever 96 is adapted to be pivoted out of engagement with the clutch by the plunger 101 of a solenoid 102. The plunger 101 is connected to the end 103 of the control lever 96 by a spring 104. When control lever 96 is so pivoted, from the position shown in FIG. 2 to the position shown in FIG. 6, the roller 99 is brought out of engagement with arm 94. When the roller 99 is moved from engagement with arm 94, the spring 89 in the clutch is able to become effective to pivot pawl 85 and bring roller 84 into engagement with one of the scallops 82. Since clutch member 78 is rotating constantly a driving connection is produced between chain 64 and shaft 71, through clutch member 79, pawl 85, pin 86 and clutch member 79. At this same time, tooth 90 comes into engagement with one of the teeth 91. This prevents container tube 21 from overrunning the drive when the tube is rotated. The engagement of the rotating auger with the container tends to produce such overrunning.

Figure 7:
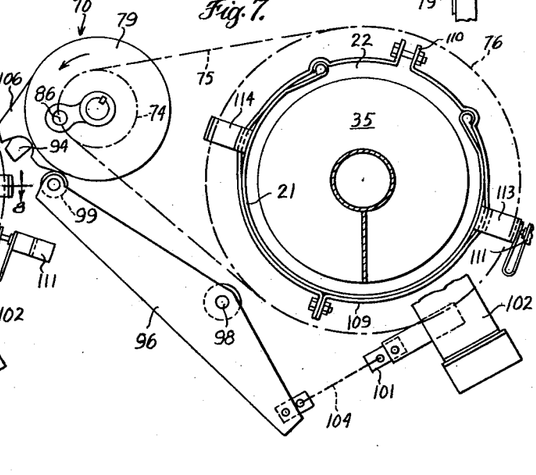
FIG. 7 is a view similar to FIG. 6 showing the clutch control lever in a position to disengage the feeder clutch.

When the control lever is pivoted back to its original position as shown in FIG. 7, the arm 94 comes around and engages roller 99 on the control arm. Pawl 85 is then pivoted and roller 84 is swung out of the particular scallop 82 in which it is seated whereby the drive to the shaft 71 is broken.

Figure 6:
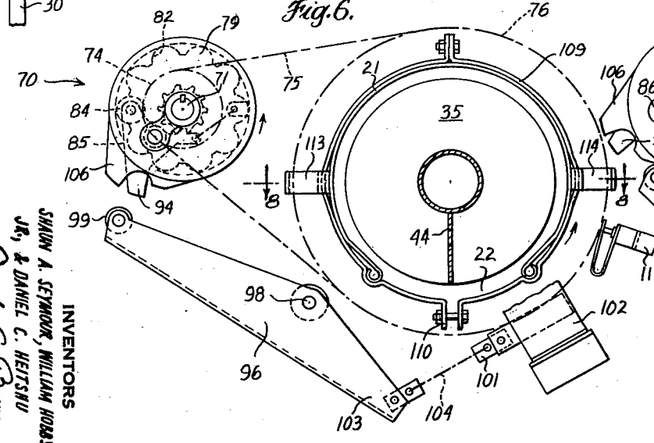
FIG. 6 is a generally diagrammatic view showing the feeder tube in dump position with the discharge slot down, the clutch control lever disengaged and the clutch pawl in driving position.

The outer clutch member 79 is keyed to the shaft 71, FIG. 4, by a key 105 to rotate with the shaft when the chain 64 is clutched to the inner clutch member 78. The outer member 79 has an integral radially projecting stop 106 to positively stop shaft 71 after a declutching has taken place. As shown in FIGS. 6 and 7, when the drive to shaft 71 is clutched in, the arm 94 and the stop 106 are angularly spaced relative to each other, with the arm 94 being in front of the stop 106 relative to the direction of rotation of the clutch. Thus, when the control lever is pivoted back to its normal position as shown in FIG. 7, the arm 94 first engages the roller 99 of the control lever to declutch the drive and immediately thereafter, the stop 106 on clutch member 79 engages the control lever to bring the shaft 71 to a complete stop, thereby preventing drift past proper position. Such drift tendency results from the engagement of auger 35 with the container tube.

The drive ratio of clutch 70 and container tube 21 is four to one, that is, it takes four revolutions of the clutch to produce one complete revolution of the container. Thus, if clutch 70 is allowed to rotate four revolutions, container 21 will be rotated 360°. If clutch 70 is allowed to rotate only two revolutions, then container 21 will be rotated only 180°. The control structure of this invention provides for (a) stopping container tube 21 with slot 22 "down" when the feeder is not in use; (b) rotating the container tube 180° to locate slot 22 in an "up" position when the feeder operation is started; (c) rotating the container tube 360° with each fill and dump operation of the feeder; and (d) stopping the container tube with slot 22 "down" when a desired number of fill and dump cycles have been achieved.

To regulate the operation of the feeder, a control structure is provided which comprises a pair of switches 111 and 112. Switch 111 operates to stop the rotation of container tube 21 with slot 22 "up," and switch 112 operates to stop the container with slot 22 "down." These switches are mounted side by side on a bracket 107 (FIG. 1) extending from the side 19 of hopper 16 and alongside the end 23 of container tube 21. The switches are spaced relative to each other in a direction parallel to the extensions of the container. For actuating the switches, which are both normally closed plunger type micro switches, actuators 113 and 114 are provided. Actuator 113 operates switch 111 and actuator 114 operates switch 112. These actuators are angularly spaced 180° relative to each other and axially spaced to be engageable with their respective switches. The actuators are carried on a band 109 which surrounds the end 23 of the container tube, a connection 110 being provided whereby the band can be loosened so that it may be slid axially on the container to properly locate the actuators 113 and 114 relative to the switches 111 and 112.

The cycling of feeder 15, and the means for controlling the cycling which is provided, constitutes an automatic electrical system. Such system is diagrammatically illustrated in FIG. 9 wherein the mechanical and electrical elements already described are symbolically shown and are to be identified by the same reference numerals used in the preceding description. Thus 50 is the driving motor, 70 the clutch whose driving and driven (inner and outer) elements are numbered 78 and 79, respectively. Element 79 carries pawl arm 94 and positive stop 106. The clutch control lever is 96, and 102 is the solenoid for pivoting such lever. The tubular container is designated 21, its longitudinally extending dumping slot being denoted 22, and the feed conveying auger 35.

The means of automation applied to these elements of the apparatus comprise the synchronous, motor driven, reset timer 108, the two switches 111 and 112, switch actuators 113, 114 carried on and revolved with container tube 21, a contactor 115, starting and stopping switches 116 and 117, respectively, and the electrical circuits which interrelate them. These circuits are supplied with power from a two-twenty volt, three wire system having a knife switch 118. The reset timer 108 is a standard commercial device as shown for example on page thirteen-three of the Fifth Edition of the Cutler-Hammer electrical components handbook. In applicants' FIG. 9, the components of the timer are diagrammatically shown for clarity of understanding of operation. Both the nature of the circuits and some additional detail of the elements they interrelate, will become apparent from the description of the operation of the system.

The knife switch 118 will normally remain closed from day to day. When closed, the three lines 123, 124 and 125 are energized and in so doing energize the pulsing solenoid 126 of reset timer 108. Solenoid 126 is energized by way of connection 127 from line 123, connection 128 to normally closed microswitch 111 and connection 129 to the opposite line 125 of the two-twenty volt circuit. Solenoid 126 pulls down one end of pivoted lever 130, raising the opposite end against the pull of the relatively strong retracting spring 131. Lever 130 carries a switch and clutch control link 133, a lost-motion and pivotal connection 139 being provided. Through a medium strength spring 132 connected between lever 130 and link 133, a pawl end 134 of the link is engaged with the end of a pivoted timer drive wheel lever 135. Lever 135 is pivoted upwardly by link 133 and so pulls a timer drive wheel 136 into driving engagement with a time-set driven wheel 137 carried rotatably on the axis 138 of timer 108. Timer 108 has a motor 140 which when energized drives a pinion 141 counterclockwise and pinion 141 drives wheel 136 clockwise, as indicated by the arrows. Wheel 136 operates to drive wheel 137 counterclockwise. Wheel 137 carries a cam 142, which in counterclockwise movement, will strike pad 143 on link 133 and pivot the link about connection 139 and disengage the link pawl 134 from the lever 135. This permits spring 144 to draw lever 135 and wheel 136 downwardly away from driven wheel 137 and allow cam 142 to be retracted to starting position by return clock spring 146 against an adjustable stop 145, so idling the timer but resetting for its next timing cycle. At the same time, the medium strength spring 132 retracts or lifts link 133, pivoting the link about the lost-motion connection 139 with lever 130. Use is made of this retracting and lifting movement to close switch 147 through pivoted lever 148, one end of lever 148 lying between pins 149 on link 133. As will be seen this switch 147 is in this closed position while the timer 108 is idle.

At the beginning of a feeding the timer is idle and container tube 21 is disposed as shown in FIG. 6, with slot 22 "down." Upon being depressed, normally open starting button switch 116 closes the circuit 150, 151 of contactor 115 through closed double throw switch 161 and normally closed stop button 117. Contactor 115 locks itself up by contact 122 through stop button 117 and normally closed micro-switch 112 in parallel over circuits 152 and 153. So long as either circuit remains closed contactor 115 remains energized. When energized, it completes the two-twenty volt circuit to drive motor 50 from lines 123, 124 and 125 by way of contacts 120 and 121, and by contact 120 completes also the circuit 154 of the timer motor 140. The auger starts rotating at once. With slot 22 "down," solenoid 102 is also energized over the circuit from locking circuit 152 by way of branch 154 extending through the now closed contacts 147 to solenoid 102, and thence to line 123. Clutch control lever 96 is pivoted free of pawl arm 94 (FIG. 6), roller 84 pivots into engagement with scallops 82, and a drive is imparted to shaft 71 to rotate container tube 21. As slot 22 approaches an "up" position, actuator 113 strikes switch 111, breaking the circuit to the pulsing solenoid 126 and immediately remaking it. Contacts 147 are opened, solenoid 102 is de-energized, and spring 100 immediately pivots lever 96 clockwise to the position shown in FIG. 7. When pawl arm 94 strikes roller 99, the clutch 70 is disengaged and upon engagement of clutch stop 106 with roller 99, container tube 21 is stopped with its slot up. At the start of a feeding operation, rotation of container tube 21 from "down" to "up" position only takes a short period and no appreciable amount of feed moves out of hopper 16 before the tube is upright.

Auger 35 continuously withdraws feed material from hopper 16 and the material is conveyed in an unbroken auger propelled stream toward container end 32. When this stream reaches the end 32, or any chosen point short of the end, it is time for the feed to be dumped. This the timer 108 accomplishes in the following manner.

The timer having been set by moving adjustable stop 145 to equate the time required for the cam 142 to be moved from adjustable stop 145 into effective engagement with pad 143, with the time required for the feed to be augered from hopper 16 to the desired point along container 21, cam 142 at that juncture pushes link 133 and its pawl 134 out of retaining engagement with drive wheel lever 135. As previously described, this permits retracting spring 144 to pivot lever 135 downwardly and withdraw wheel 136 from engagement with cam wheel 137. Upon being freed, link 133 is raised by spring 132 and lever 148 is pivoted. Such pivoting actuates the switch 147 to close switch 147 and again establish the circuit 154 of clutch control solenoid 102 from line 123 to locking circuit 152. Clutch control lever 96 is oscillated out of its declutching engagement with clutch pawl arm 94 of clutch 70 (FIG. 6) and positive stop 106 whereupon the clutch becomes engaged to drive shaft 71 to rotate the container tube 21 counterclockwise for the dump.

Container tube 21 rotates 360°, moving the dumping slot 22 from its "up" or filling position, to and through its "down" or dumping position, and back to its "up" or filling position. In this movement, and at a stage of rotation about 15° less than 180°, switch actuator 114 on the container momentarily opens locking circuit 153 at microswitch 112. But this is of no effect since stop switch 117 paralleling it remains closed. Solenoid 102 remains energized and rotation of the tube 21 therefore continues on toward 360°. In due course, and about 15° before the 360° position is reached, where slot 22 is again "up," switch actuator 113 momentarily opens micro-switch 111. This momentarily opens the circuit 128, 129 of the timer pulsing or resetting solenoid 126. When solenoid 126 is de-energized, the relatively strong spring 131 pivots lever 130 to depress link 133 and open switch 147. This de-energizes clutch control solenoid 102, whereupon spring 100 pivots lever 96 from the position shown in FIG. 6 to the position of FIG. 7 to re-engage pawl lever 94 and positive stop 106 and bring the container tube 21 to a full stop with the dump slot again in its "up" position. As the tube rotation comes to a close, switch 111 is reclosed to re-energize pulsing solenoid 126. Depressed link 133 having ratcheted its pawl 134 past the end of drive wheel lever 135 when it was moved downward to close switch 147, re-energized solenoid 126 now raises lever 135 and re-engages wheels 136 and 137 so instituting another timing cycle.

A feeder 15 which is one hundred and fifty feet long might require about one and one half minutes of auger operation before feed reaches the terminal end 32. This time factor will depend upon the r.p.m. of auger 35, the pitch of its flights, the efficiency of the conveyance and other factors. One merely moves stop 145 right or left as the progress of the stream approaches end 32 until cam 142 releases lever 133 and recloses contacts 147 at the time the stream reaches to the desired point. A trial or two serves to effect the adjustment desired.

The timer 108 will continue to automatically cycle, filling and dumping, until the operator is ready to discontinue the feeding. The auger 35 of course rotates continuously during the cycle, but the time required for tube rotation is relatively so small as compared with the time of refilling that there is no consequential non-uniformity of feed distribution at the infeed end of the tube 21. When the operator wishes to stop feeding, he presses stop button 117, holding it down or using spring latch 155 to retain the switch opened. Even though button 117 is being held down, the particular feeding cycle which is in progress continues until the dump is complete because the contactor 115 (and when energized also the clutch solenoid 102) is locked up not only by stop button 117 but also by the 180° micro-switch 112. Thus, the cycle continues not only until the timer 108 times out and the tube is completely charged, but also until the completed charge is dumped. For as the timer "times out" by camming over link 133, solenoid 102 is again energized by way of contacts 147. It pivots clutch control lever 96 and container tube 21 is once more rotated. As discharge slot 22 approaches a "down" position, switch actuator 114 opens switch 112 and since switch 117 is being held open, the locking circuits 152 and 153 are both opened at one and the same time. Contactor 115 and solenoid 102 are both de-energized and all circuits are opened and maintained open, except the circuit of the pulsing solenoid 126 of the timer 108. Lever 96 returns to the position shown in FIG. 7 and tube 21 is stopped with slot 22 "down" and switch 147 closed. Stop button 117 can now be released without re-energizing solenoid 102, for locking circuits 152 and 153 reach circuit 154 only through now open contact 122 of circuit breaker 115. The feeder is then completely idle but ready for subsequent operation at any time the operator again pushes the start button 116.

The stopping of container tube 21 with slot 22 "down" after a desired number of fill and dump operations are performed is an important feature of this invention. When not in use, and with slot 22 "down," the container tube 21 provides its own roof; rain, snow and the like is thus kept out of the tube. Further, finishing a feeding operation with the slot 22 "down," insures complete discharge of feed.

The push button switches 116 and 117 provide semi-automatic operation of feeder 15, the feeder being started employing button 116 and stopped using button 117. Beyond starting and stopping, however, the apparatus is fully automatic. To render the apparatus wholly automatic, a conventional commercially available clock regulator or periodic timer 160 can be substituted for button controls 116 and 117. Such a clock timer 160 is diagrammatically illustrated in FIG. 9. The double pole, double throw switch 161 which when in solid line position places push button switches 116 and 117 in the control circuit and when in the dotted line position disconnects the button switches from the circuit and cuts in the clock timer 160.

The clock timer has a normally open switch 162 actuated by timer cam 164 to institute the operation of feeder 15 at proper times such as six a.m., nine a.m., noon, three p.m. and six p.m., and to maintain it in operation for a chosen number of minutes. The length of time the feeder is operated at each of these intervals is variable, by adjusting timer 160, as is conventional. The operator will set the timer to close switch 162 at desired intervals, run the feeder for the desired number of minutes, and then open and maintain open switch 162 until the next feeding time arrives. Automatically maintaining switch 162 open serves to insure completion of the cycle then in progress in the same manner that holding down stop button 117 does it. Thus the single automatic switch 162 performs the functions of the two manually operated switches 116 and 117.

Figures 9, 10:
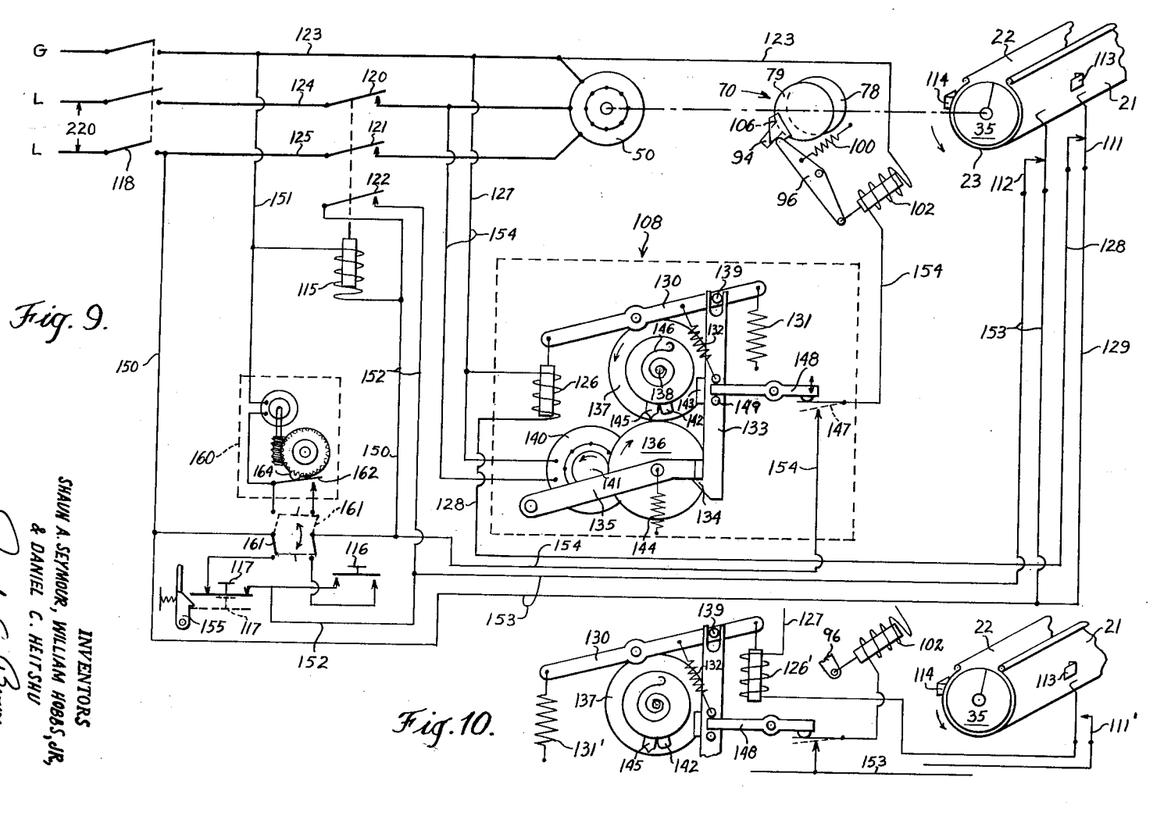
FIG. 9 shows the circuits employed whereby the feeder can be operated semi-automatically and full automatic, respectively.
FIG. 10 shows a modification in the timer control of the device.

It will be understood, that both the clock timer 160 and the push button controls 116 and 117 can be provided on a single feeder, the particular method used being selective using the switch 161. However, for cost reasons, one or the other would likely be employed. With the timer 108 organized as shown in FIG. 9, when power fails during a feeding operation, pulsing solenoid 126 is de-energized, and if there is a power failure, when power is restored pulsing solenoid 126 is re-energized and becomes effective to reset the timer 108. This may temporarily cause some over feeding of the tube by the auger depending upon the point in a cycle where the failure occurs. Therefore, if desired, the timer can be arranged as shown in FIG. 10 with the pulsing solenoid and reset spring reversed in location in relation to lever 130 and indicated 126' and 131', respectively. With such an arrangement the spring 131' holds the lever 130 pivoted even if power fails and there is no extra cycling when power is restored. Recycling then takes place only when solenoid 126' is energized via switch 111, in this case normally open but being momentarily closed by actuator 113 at the end of a feeding cycle to effect the cycling re-set.

While this invention has been described in connection with certain particular embodiments thereof it will be understood that it is capable of further modifications, and this application is intended to cover any variations, uses or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A fill and dump stock feeder comprising, in combination, a feed hopper having a discharge outlet, an elongated container communicating with said outlet to receive feed from the hopper, said container extending in a horizontal direction and having rectilinear slot means along a major portion of its length, means mounting said container for rotation about its longitudinal axis, means conveying and distributing feed taken from said hopper along the length of said container, drive means rotating said container to locate said slot means in an up position when feed is being conveyed and distributed in the container and in a lower position to dump feed from the container, means stopping rotation of said container with said slot means in an up position, means stopping rotation of said container at the end of an operating cycle with said slot means in a down position, means operating said stopping means, and means mounted on the feeder and operatively associated with said operating means to control said stopping means.

2. A fill and dump stock feeder comprising, in combination, a feed hopper having a discharge outlet, an elongated container communicating with said outlet to receive feed from the hopper, said container extending in a horizontal direction and having rectilinear slot means along a major portion of its length, means mounting said container for rotation about its longitudinal axis, means conveying and distributing feed taken from said hopper along the length of said container, drive means rotating said container to locate said slot means in an up position when feed is being conveyed and distributed in the container and in a lower position to dump feed from the container, means stopping rotation of said container with said slot means in an up position and stopping and leaving said container with said slot means in a down position, electrically actuated means operating said stopping means and including a pair of switches, one stopping rotation of said container with the slot means in said up position and one stopping rotation of said container with the slot means in said lower position, and means on the feeder operating said switches.

3. A fill and dump stock feeder comprising, in combination, a feed hopper having a discharge outlet, an elongated container communicating with said outlet to receive feed from the hopper, said container extending in a horizontal direction and having a slot along a major portion of its length, means mounting said container for rotation about its longitudinal axis, means conveying and distributing feed taken from said hopper along the length of said container, drive means rotating said container to locate said slot in an up position when feed is being conveyed and distributed in the container and in a lower position to dump feed from the container, means positively stopping rotation of said container with said slot in either of said positions, electrically actuated means operating said stopping means and including a pair of switches, one stopping rotation of said container with the slot in said up position and one stopping rotation of said container with the slot in said lower position, means mounting said switches alongside said container and spaced relative to each other along the container axis, and a pair of switch actuators connected to said container, one actuator operating one switch on rotation of the container and the other actuator operating the other switch, said actuators being both axially and angularly spaced relative to each other.

4. A fill and dump stock feeder as recited in claim 3 wherein said switch actuators are mounted on said container on opposite sides of said slot and axially spaced relative to each other.

5. A fill and dump stock feeder as recited in claim 3 wherein said switch actuators are mounted on said container for adjustment axially relative thereto.

6. A fill and dump stock feeder as recited in claim 3 wherein said drive means comprises a rotatable clutch having a movable declutching element and a stop member, and said stopping means comprising a lever movable into and out of engagement with said declutching element and stop member.

7. A fill and dump stock feeder as recited in claim 6 wherein said declutching element and stop member are angularly spaced relative to each other when the clutch is rotating said container, the direction of rotation of the clutch and the location of said element and member being such that said lever is engageable with said declutching element and then said stop member.

8. A fill and dump stock feeder as recited in claim 3 wherein said stopping means comprises a lever pivoted between its ends, spring means connected to one end of the lever and biasing it to pivot in one direction, and a solenoid connected to the other end of the lever for pivoting the lever in an opposite direction and against the resistance of the spring means.

9. A fill and dump stock feeder as recited in claim 3 wherein said drive means includes means for preventing said container from overrunning the drive means when the container is rotated.

10. A fill and dump stock feeder comprising, in combination, a feed hopper having a discharge outlet, an elongated container communicating with said outlet to receive feed from the hopper, said container extending in a horizontal direction and having a slot along a major portion of its length, means mounting said container for rotation about its longitudinal axis, means conveying and distributing feed taken from said hopper along the length of said container, drive means rotating said container to locate said slot in an up position when feed is being conveyed and distributed in the container and in a lower position to dump feed from the container, power means connected to said conveying and distributing means and to said container rotating drive means, a timer operative after a given period of operation of said conveying and distributing means instituting rotation of said container via said drive means, means positively stopping rotation of said container with said slot in an up position, means positively stopping and leaving said container with said slot in a down position, means operating said stopping means, and electrical control means regulating the operation of said timer, said conveying and distributing means and said stopping means.

11. A fill and dump stock feeder as recited in claim 10 wherein said electrical control means comprises a circuit having a start switch and a stop switch, said start switch normally being opened and said stop switch normally being closed.

12. A fill and dump stock feeder as recited in claim 11 wherein means is provided and engageable with said stop switch to hold the switch in an opened position.

13. A fill and dump stock feeder as recited in claim 11 wherein said electrical control means comprises a circuit having a time clock which starts and stops the operation of the feeder at desired intervals.

14. A fill and dump stock feeder to simultaneously supply feed to an elongated feeding station for a plurality of stock animals to feed comprising, in combination, an elongated feed distributing container adapted to extend in a horizontal direction along the feeding station, means mounting said container for rotation about its longitudinal axis, means supplying feed to said container, means for conveying and distributing feed along the length of the container, said container being formed to define a discharge slot which extends substantially the length of the container and parallel to said axis, means rotatably supporting said container with said slot in an up position when feed is being conveyed and distribtued and for rotating the container to move said slot to a lower position to discharge feed from the container, drive means for rotating said container including a rotatable clutch, four revolutions of the clutch being required for one revolution of the container, means engaging said clutch for stopping the rotation thereof after four revolutions to thereby rotate said container 360° and then stop, and for stopping the rotation of the clutch after two revolutions to thereby rotate the container 180° and then stop, and means controlling the operation of said stopping means.

15. A fill and dump stock feeder as recited in claim 14 wherein said controlling means comprises a pair of switches wired in a circuit whereby one switch stops the container after a 360° rotation and the other switches stop the container after a 180° rotation, and a pair of switch actuators carried on the container spaced 180° apart, one actuator operating one switch and the other actuator operating the other switch.

16. A fill and dump stock feeder to simultaneously supply feed to an elongated feeding station for a plurality of stock animals to feed comprising, in combination, an elongated feed distributing container adapted to extend in a horizontal direction along the feeding station, means mounting said container for rotation about its longitudinal axis, means for supplying feed to said container, means for conveying and distributing feed along the length of the container, said container being formed to define rectilinear discharge slot means which extends substantially the length of the container and parallel to said axis, means rotatably positioning said container with said slot means in an up position when feed is being conveyed and distributed and for rotating the container to move said slot means to a lower position to discharge feed from the container, a timer instituting operation of said rotatable positioning means after a set period of operation of said conveying and distributing means, said timer having means for self-resetting after a set period and means for insuring completion of a given set period if such period is interrupted before completion, means for stopping the rotation of said container with said slot means in said up position, and means for stopping rotation of said container at the end of an operating cycle with said slot means in said down position and for leaving the slot means down.

17. A fill and dump stock feeder to simultaneously supply feed to an elongated feeding station for a plurality of stock animals to feed comprising, in combination, an elongated feed distributing container adapted to extend in a horizontal direction along the feeding station, means mounting said container for rotation about its longitudinal axis, means for supplying feed to said container, means for conveying and distributing feed along the length of the container, said container being formed to define rectilinear discharge slot means which extends substantially the length of the container and parallel to said axis, means rotatably positioning said container with said slot means in an up position when feed is being conveyed and distributed and for rotating the container to move said slot means to a lower position to discharge feed from the container, a timing motor connected to said rotatable positioning means to institute rotation of said container after a given operation of said conveying and distributing means, and means operative through said timing motor for positively stopping said container with said slot means in said lower position at the end of an operating cycle and for leaving the slot means in the lower position.

References Cited in the file of this patent
UNITED STATES PATENTS

| | | |
|---|---|---|
| 863,071 | Kirstein | Aug. 13, 1907 |
| 2,940,639 | Winter | June 14, 1960 |

Disclaimer 3,129,851.—*Shaun A. Seymour*, New Holland, *William Hobbs, Jr.*, Lancaster, and *Daniel C. Heitshu*, Shippensburg, Pa. FEEDER FOR STOCK ANIMALS. Patent dated Apr. 21, 1964. Disclaimer filed Sept. 2, 1965, by the assignee, *Sperry Rand Corporation*.

Hereby enters this disclaimer to claims 1, 2, 3 and 4 of said patent.
 [*Official Gazette December 28, 1965.*]